United States Patent Office 2,966,480
Patented Dec. 27, 1960

2,966,480

SUSPENSION COPOLYMERIZATION OF VINYL ESTERS AND UNSATURATED ALIPHATIC ACIDS

Harry Wechsler, Leominster, and Stanley S. Levy, Malden, Mass., and Ralph Herbst, Jr., Huntingdon Valley, Pa., assignors to The Borden Company, a corporation of New Jersey No Drawing. Filed Feb. 11, 1958, Ser. No. 714,469

2 Claims. (Cl. 260—85.7)

This invention relates to the copolymerization of vinyl esters in water suspension with unsaturated aliphatic acids.

The invention is particularly useful in making the copolymer of vinyyl acetate and crotonic acid and will be first illustrated, therefore, by description in connection with such use.

The copolymers of vinyl acetate with a water soluble and ethylenic bond polymerizable acid such as crotonic are useful, as in the form of aqueous solutions of their salts, for adhesives, coating compositions for paper, warp sizes for textiles, and casting into films to be air dried, especially when the salt used in the casting solution is ammonium. For making such salts soluble, it is important to copolymerize crotonic acid or the like rather uniformly with the ester and in amount to make possible the necessary proportion of salt to the total copolymer, when the alkali is introduced.

A conventional preparation of these copolymers involves suspension copolymerization of the vinyl ester and the unsaturated fatty acid. The vinyl ester is suspended as droplets, as the chief component of the oil phase. The acid at the start is dissolved in part in the aqueous phase. Benzoyl peroxide is a commonly employed initiator of the polymerization.

Suspension of the polymers so made are not dependably stable as the discrete particles tend to lump together into one mass. Solutions made by subsequently adding alkali are not clear.

Our invention provides a means of so promoting the copolymerization of the vinyl ester and crotonic acid at the interface between the two phases of the aqueous suspension, as well as within the droplets of vinyl acetate, that the resulting copolymer suspension is satisfactorily stable and the resulting beads, in ammonium hydroxide, for instance, give a substantially clear solution of the salt of the copolymer with the added alkali.

Briefly stated, the invention comprises effecting the copolymerization of the vinyl ester and the unsaturated fatty acid in contact with an oil soluble initiator of the copolymeriaztion and also a water soluble initiator.

With such a combination we are able to obtain a suspension having a high proportion of copolymerized unsaturated acid and the desired suspension stability during polymerization and alkali solubility of the finished copolymer.

As to materials, the vinyl ester used is that of a $C_2$–$C_{18}$ fatty acid. Ester that are suitable include vinyl acetate, propionate, butyrate, and stearate. These esters have a high dissolving power for organic peroxides and serve, therefore, to concentrate the lipophylic peroxide in the vinyl ester or oil phase of the aqueous suspension.

The acid to be copolymerized is water soluble, with a distribution coefficient that favors solution of the acid in water. The acid must be ethylenic bond polymerizable (here copolymerizable). Examples of acids that meet these requirements and illustrate the class to be used are crotonic, fumaric, maleic, and mesaconic.

The oil soluble initiator may be any one of the organic peroxy compounds commonly used in polymerizing vinyl acetate. Examples are dibenzoyl, ditertiary-butyl, and dilauroyl peroxides and perphthalates and the corresponding monoesters of perbenzoic and peracetic acid.

As the initiator that is preferentially soluble in the water phase, hydrogen peroxide is both economical and satisfactory and is the one that we use.

To assist in the suspension in the aqueous medium of the vinyl acetate phase, including a major part at least of the oil soluble initiator, there is used to advantage a suspending agent. This may be any conventionally used material for promoting the suspension of vinyl acetate in water. Polyvinyl alcohol is particularly satisfactory and is the one used by us. Other suspending agents that may be used are hydroxyethyl cellulose, sodium salt of carboxymethyl cellulose, gelatine, and the salts of copolymers of methyl methacrylate or methyl acrylate with unsaturated acids.

Proportions may be varied within limits in accordance with the properties desired in the finished suspension and with the specific properties of the materials selected within the several classes of components. The variation may be particularly large in the case of the suspending agent used to improve the stability.

Proportions of the various components for best or commercial results are shown in the following table along with a wider range of proportions permissible for less satisfactory results.

In this table and elsewhere herein proportions are expressed as parts by weight except when stated specifically to the contrary.

| Component | Parts by Weight | |
|---|---|---|
| | Commercial Proportions | Permissible Range |
| Vinyl acetate | 100 | 100 |
| Water | 50–300 | 30–500 |
| Crotonic acid | 1–10 | 1–30 |
| Organic peroxide | 0.3–2 | [1] 0.1–3 |
| Hydrogen peroxide (30% calc. to anhyd. basis) | 0.01–0.05 | [1] 0.1–1 |
| Suspending agent (percent of the water used) | 0.05–5 | 0.05–10 |

[1] Proportions of the peroxides used should in all cases be below the proportion that is hazardous for the particular peroxide selected and under the conditions of use.

The unsaturated fatty acid in the commercial proportion is about 0.01–0.1 mole and in the permissible range about 0.01–0.3 mole for 1 mole of the vinyl acetate. When the vinyl acetate is substituted by another vinyl ester or the crotonic acid is substituted by another ethylenic bond copolymerizable acid, the numbers of parts by weight of the ester and acid are altered to keep the molecular ratios about as calculated above for the ester and the copolymerizable acid.

As to conditions of manufacture, the components are stirred together vigorously to promote suspension of the oil phase as fine droplets in the aqueous medium or phase. The temperature is raised gradually to about 50°–95° C., ordinarily to about 70°–95° C., and maintained in that range with continuous, vigorous agitation until copolymerization is effected. This requires ordinarily about 2–6 hours. The time required for the polymerization is indicated by rapid rise in the temperature of refluxing (as the vinyl acetate is used up), up to a temperature of about 95°–96° C. at 760 mm. It may be determined, for a given set of conditions, by removing specimens of the mixture during the heating and noting the time when the droplets have become hard beads that dissolve completely in alkali solution. When the copolymerization has been effected, the beads are separated by centrifuging or otherwise.

A clear solution of a salt of the copolymer is made by mixing the beads with the selected alkali in water solution, as for instance with concentrated ammonium hydroxide solution containing about 1%–5% of ammonia ($NH_3$) based on the weight of the beads. In an alterantive procedure, there is used an aqueous solution containing about 1%–2.5% of sodium hydroxide based on the weight of the copolymer.

After the alkali is added in either case, the whole is maintained in warm condition, as at a temperature of about 50°–80° C., until the suspension becomes converted to a clear, stable, solution free of insolubles.

The copolymerization may be carried out batchwise with both monomers being added initially, or one of the monomers (preferably crotonic acid) may be added stepwise over a period of time.

The invention will be further illustrated by description in connection with the following specific examples of the practice of it.

*Example 1*

There was agitated vigorously a composition of the following proportions:

| Component: | Parts by weight |
|---|---|
| Vinyl acetate | 100 |
| Water | 104 |
| Polyvinyl alcohol | 0.16 |
| Benzoyl peroxide | 0.65 |
| Hydrogen peroxide (30% solution) | 0.03 |
| Crotonic acid | 3.8 |

The temperature was raised by heating gradually to refluxing with continuance of the vigorous agitation.

Approximately 75% of the total polyvinyl alcohol suspending agent was added initially, the balance of it when the temperature of the mix reached 75° C. This second addition, it is considered, restores polyvinyl alcohol that may have been acetalized or otherwise complexed. The whole was then refluxed until the copolymerization was effected, namely for 6 hours.

The resulting vinyl acetate-crotonic acid copolymer beads were in the suspended aqueous solution. They were mostly of diameter 0.25–0.50 mm.

Tests show that omission of the hydrogen peroxide results in both instability of the suspension and incomplete solubility of the beads in ammonia solution.

The suspended beads are separated from the suspension so made as by filtration or centrifugation. The beads so separated may be dried for shipment.

To make the salt of the copolymer of vinyl acetate and an unsaturated acid, the beads are sifted into a cold water solution containing the alkali, such as concentrated ammonium hydroxide in amount to provide 1%–5% of actual ammonia on the weight of the beads.

In a modification of this example, the ammonium hydroxide solution is replaced by an aqueous solution of sodium hydroxide containing 1%–2.5% of sodium hydroxide based on the weight of the beads. In either case, the formation of the salt is accelerated by heating the beads in the alkali solution to a temperature of 70° C. for 15 minutes during which a clear solution results.

*Example 2*

The procedure and composition of Example 1 are used except that the vinyl acetate is replaced by an equivalent weight of vinyl propionate, butyrate, oleate or stearate.

*Example 3*

The procedure and composition of Example 1 or 2 are used with the exception that the crotonic acid is replaced by an equivalent weight of any of the other ethylenic bond polymerizable fatty acids disclosed herein.

*Example 4*

The procedure and composition of Example 1, 2 or 3 are used except that the benzoyl peroxide is replaced by an equal weight of any of the other oil soluble initiators disclosed herein and the polyvinyl alcohol by any of the other suspending agents disclosed and in the proportion of about 0.1%–10% of the weight of the water present.

It is to be understood that it is intended to cover all changes and modifications of the examples of the invention herein chosen for the purpose of illustration which do not constitute departures from the spirit and scope of the invention.

We claim:

1. In the process of making a copolymer of a vinyl ester selected from the group consisting of vinyl acetate, vinyl propionate, vinyl butyrate and vinyl stearate with a water soluble ethylenic bond copolymerizable aliphatic acid selected from the group consisting of crotonic, fumaric, maleic and methaconic acids, the improvement which comprises forming a suspension of fine particles of the vinyl ester and an organic peroxide polymerization initiator dissolved in the said ester in an aqueous solution of the said acid, polyvinyl alcohol, and hydrogen peroxide as the initiator, warming the said suspension to at least 75° C. until polymerization of the said ester and acid is effected and then separating the resulting copolymer beads from the remaining aqueous phase, approximately 75% of the polyvinyl alcohol being admixed in advance of said warming of the suspension and the remainder being introduced when the temperature has been raised to approximately 75° C. and the proportions used being 0.01–0.3 mole of said polymerizable acid for each mole of said ester, and for 100 parts by weight of the vinyl ester, 30–500 parts of water, 0.01–1 part of the hydrogen peroxide on the anhydrous basis, 0.1–3 parts of the organic peroxide initiator, and 0.05–10 parts of the polyvinyl alcohol.

2. The process of making a copolymer of vinyl acetate and crotonic acid comprising the steps of forming a suspension of fine particles of the vinyl acetate and benzoyl peroxide dissolved therein in an aqueous solution of the crotonic acid, polyvinyl alcohol, and hydrogen peroxide as the initiator, warming the said suspension to at least 75° C. until polymerization of the said ester and acid is effected, and then separating the resulting copolymer beads from the remaining aqueous phase, approximately 75% of the polyvinyl alcohol being admixed in advance of the said warming of the suspension and the remainder being introduced when the temperature has been raised to approximately 75° C. and the proportions used by weight being, for 100 parts of vinyl acetate, 30–500 parts of water, 1–30 parts of crotonic acid, 0.1–3 parts of benzoyl peroxide, 0.01–1 part of hydrogen peroxide on the anhydrous basis, and 0.05–10 parts of the polyvinyl alcohol.

References Cited in the file of this patent

UNITED STATES PATENTS

| 2,300,566 | Hahn et al. | Nov. 3, 1942 |
| 2,565,783 | Schouteden et al. | Aug. 28, 1951 |
| 2,715,590 | Brockman et al. | Aug. 16, 1955 |
| 2,806,020 | Scott et al. | Sept. 10, 1957 |

FOREIGN PATENTS

| 506,989 | Belgium | Nov. 30, 1951 |
| 906,863 | French | May 28, 1945 |